Oct. 8, 1935.  J. A. COBB  2,016,768
SCALE
Filed May 9, 1935
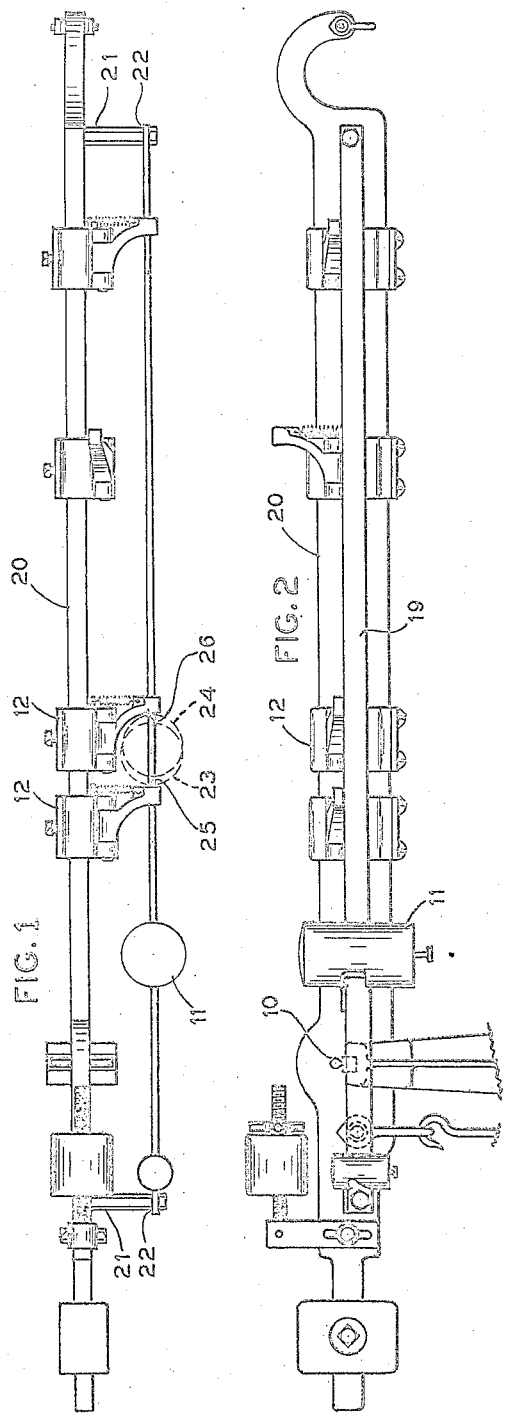
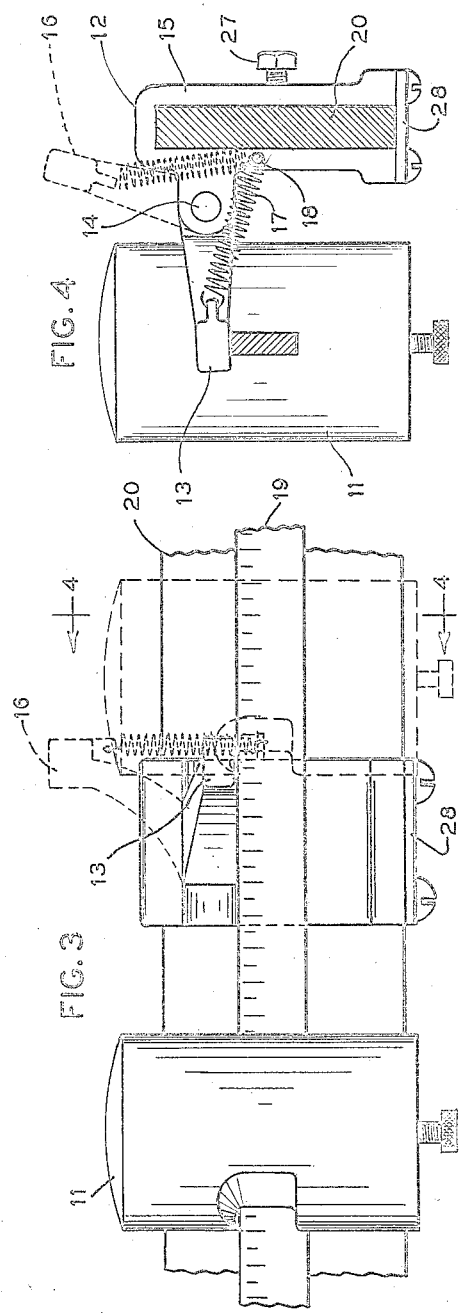
INVENTOR
JOHN A. COBB
BY Roland C. Rehm
ATTORNEY Patented Oct. 8, 1935

2,016,768

UNITED STATES PATENT OFFICE 2,016,768

SCALE

John A. Cobb, Columbus, Ohio, assignor to Streeter-Amet Company, Chicago, Ill., a corporation of Illinois Application May 9, 1935, Serial No. 20,531

8 Claims. (Cl. 265—49)

This invention relates to scales and the like and, among other objects, aims to provide an improved and simplified mechanism for adjusting the scale for various tare or other predetermined weights.

The invention may be readily understood by reference to one illustrative construction shown in the accompanying drawing.

In said drawing:

Fig. 1 is a plan view of a scale beam equipped with poise setting devices;

Fig. 2 is an elevation of the beam;

Fig. 3 is an enlarged fragmentary elevation of a setting element; and

Fig. 4 is a side, sectional elevation thereof taken from the plane 4—4 of Fig. 3.

The common practice in weighing materials carried on and off a scale in vehicles or other containers, is to adjust the scale to the weight of the vehicle or other container (i. e., to the tare weight) so that the weight indication of the scale will be the actual weight of the materials themselves. This practice becomes difficult and leads to inaccurate results where loads are placed on the scale in rapid succession, as where a series of cars of various types are moved on and off the scale in rapid succession. The cars having different tare weights, it is difficult for the weigh master accurately to adjust the usual tare poise for the tare weight of the successive vehicles. Regardless of the skill of the weigh master, the knowledge that hastily adjusted tare poises may produce errors in the indicated weights of the materials, is the source of suspicion and complaint. While this difficulty is general, it is more or less acute in coal and other mining where the miners are paid on the basis of materials mined which are weighed in mine cars passing in rapid succession across the scale. Generally two or three types of mining cars are in use, requiring a readjustment of the tare poise every time a different type of car comes on the scale.

The present invention provides mechanism by which a scale may be both quickly and accurately adjusted to a predetermined tare or other weight. The invention is here illustrated as embodied in the tare beam of a conventional beam scale but, as will presently appear, the invention is not limited to the adjustment of tare poises and, among other uses, may be employed for setting a scale quickly and accurately to other predetermined weights.

For the sake of simplicity, illustration of the tare beam has not been complicated by conventional scale mechanism since this is well known and forms no part of the invention. The beam is fulcrumed at 10 and embodies independent guide or slideways respectively for a tare or other poise 11 and a stop or stop elements 12, the latter being adjustable along the beam to positions where it is desired to set the poise 11. Such stopping elements in this instance include a stop arm 13 adapted to be moved into or out of the path of the poise 11. As here shown, the arm 13 is hinged at 14 to the body 15 of the stop member and when moved down, is in position to be engaged by a part of the poise 11, thereby serving as a stop to locate the poise at a predetermined position along the beam. When elevated as shown in dotted lines at 16 (Fig. 4), the arm will clear the poise, leaving the latter free to be moved to any position along the beam. Indeed, as indicated in dotted lines in Fig. 4, the poise may be located precisely in the position from which it would be excluded were the arm 13 in operative position and not movable therefrom without bodily shifting the stop element (which would change the balance of the beam).

A spring 17 is advantageously employed to hold the stop arm either in active or idle position. For this purpose the spring is connected to the body of the stop at a point 18 which is on the opposite side of the hinge and at an intermediate point in the swing of the arm so as not to be in alignment with the hinge at either the set or idle positions of the arm. This insures that the arm will remain in its selected position (idle or operative) and will not be accidentally displaced.

A stop device 12 is employed for each of the desired predetermined positions of the poise (representing various tare or other predetermined weights) and set in such position along the beam that each of the devices will insure the setting of the poise in a predetermined position along the beam. In adjusting the scale for a given load, such as a predetermined tare load, it is merely necessary for the weigh master to flip down the desired stop arm and move the poise until it is arrested by the stop arm, any other arms in the path of the poise having been flipped up to clear the poise. Regardless of the speed with which this operation is performed, the accurate setting of the poise is insured.

As stated above, the poise and the stops are carried so that they are independent of each other and particularly so that the poise may be moved entirely independently of the stops, permitting it to be located in any desired position regardless of the location of any particular stop (see Fig. 4). For this purpose the guideway along which the poise slides is independent of the portion of the beam carrying the stops. In the present instance the poise is carried on a graduated bar 19 spaced from the bar 20 which carries the stops. The poise bar 19 is cleared merely by raising all the stop arms 13, thus allowing the poise to be set at any desired position along the beam regardless of the location of the stops. Such freedom of adjustment is particularly desirable for testing the scales, an operation which may occur with daily frequency; but independence of the poise is desirable for other reasons which need not be enumerated here. As regards testing the scale, it should be particularly noted that raising of the stop arms to clear the beam does not disturb the balance of the beam and shifting or the removal of the stops is not necessary for any purpose except when it is desired to locate them in another predetermined position. The necessity for such bodily shifting seldom occurs in practice. It will be understood that a poise guideway independent of or clearing the stops may be provided in a variety of other ways than that shown.

In the present arrangement the poise bar 19 is shown carried by the bar 20 by means of studs 21 which have shoulders 22 to space the bars.

The aforesaid independent relationship of the poise bar and the stops advantageously permits a setting of the poise in two closely adjacent positions as where the tare or other predetermined weights differ by only a few pounds. As shown in Figs. 1 and 2, predetermined settings of the poise in the closely adjacent positions represented by the full and dotted outlines 23 and 24 of the poise may be effected by locating a pair of stops 12 so that the poise is arrested in position 23 by engagement with the side 25 of one stop arm and in position 24 by engagement with the face 26 of the other stop arm.

The bodies of the stops are here shown of channel or U-shape so as to embrace the bar 20 and are provided with set screws 27 for holding the stops in predetermined position. A retainer plate 28 screwed to the open side of the channel provides a closed channel embracing the bar 20.

Obviously the invention is not limited to the details of the illustrative construction since these may be variously modified. Moreover, it is not indispensable that all features of the invention be used conjointly since various features may be used to advantage in different combinations and subcombinations.

Having described my invention, I claim:

1. In a scale the combination comprising a beam having a poise guideway, a poise slidable thereon, a stop element mounted on said beam in position to be cleared by the poise, a member carried by said stop element and movable into the path of said poise so as to be engaged by a part thereof, and means for adjusting said stop element on said beam so that it may be fixed on the beam to locate the poise in a predetermined position.

2. In a scale the combination comprising a beam having a poise guideway, a poise slidable thereon, a stop element mounted on said beam in position to be cleared by the poise, a member carried by said stop element and movable into the path of said poise so as to be engaged by a part thereof, means for holding said member against accidental displacement when positioned either in or out of the path of the poise, and means for adjusting said stop element on said beam so that it may be fixed on the beam to locate the poise in a predetermined position.

3. In a scale the combination comprising a beam having a pair of guideways, a poise slidable on one guideway, a stop element slidable on the other guideway, said element carrying a member movable into or out of the path of said poise, a device for fixing said element to said beam to serve as a selective stop to locate the poise in a predetermined position on the beam, said guideways being arranged so that the poise may be moved freely along its guideway and located in any desired position thereon.

4. In a scale the combination comprising a beam having a poise guideway, a poise slidable thereon, a stop element mounted on said beam in position to be cleared by the poise, a member carried by said stop element and movable into the path of said poise so as to be engaged by a part thereof, a spring arranged to hold said member either in idle or operative position against accidental displacement, and means for adjusting said stop element on said beam so that it may be fixed on the beam to locate the poise in a predetermined position.

5. In a scale the combination comprising a beam having a poise guideway, a poise slidable thereon, a stop element mounted on said beam in position to be cleared by the poise, said element carrying a hinged arm adapted to be moved into or out of the path of said poise, and means for adjusting said stop element on said beam so that it may be fixed on the beam to locate the poise in a predetermined position.

6. In a scale the combination comprising a beam having a poise guideway, a poise slidable thereon, a stop element mounted on said beam in position to be cleared by the poise, said element carrying a hinged arm adapted to be moved into or out of the path of said poise, a spring connected to said arm and to the stop element at a point beyond the hinge and adapted resiliently to hold the arm either in idle or operative positions, and means for adjusting said stop element on said beam so that it may be fixed on the beam to locate the poise in a predetermined position.

7. In a scale the combination comprising a beam adapted to carry one or more stop elements slidable thereon, a poise bar carried by said beam and spaced therefrom, a poise slidable on said poise bar independently of said stop elements, said stop elements carrying movable members adapted to be moved into or out of the path of the poise to locate the latter in a predetermined position, and means for adjustably fixing said stop elements in desired positions on the beam.

8. In a scale the combination comprising a tare beam having a pair of guideways, a tare poise on one of said guideways and a plurality of stop elements on the other guideway, setting devices on said stop elements for fixing the latter in predetermined positions along the beam, said stop elements carrying stop arms selectively movable into operative position to be engaged by a part of the poise to locate the latter in predetermined position, said arms being movable out of operative position to allow the poise to be moved freely along the beam to any desired position, and means for holding the arms in position against accidental displacement.

JOHN A. COBB.